(12) United States Patent
Dorren et al.

(10) Patent No.: US 9,331,790 B2
(45) Date of Patent: May 3, 2016

(54) FULLY DIGITAL CMOS BASED OPTICAL RECEIVER

(71) Applicant: Technische Universiteit Eindhoven, Eindhoven (NL)

(72) Inventors: Harmen Joseph Sebastiaan Dorren, Eindhoven (NL); Oded Raz, Eindhoven (NL)

(73) Assignee: Technische Universiteit Eindhoven, Eindhoven (NL)

(*) Notice: Subject to any disclaimer, the term of this patent is extended or adjusted under 35 U.S.C. 154(b) by 0 days.

(21) Appl. No.: 14/577,155

(22) Filed: Dec. 19, 2014

(65) Prior Publication Data

US 2015/0104198 A1 Apr. 16, 2015

Related U.S. Application Data

(63) Continuation-in-part of application No. 14/283,687, filed on May 21, 2014, now abandoned.

(60) Provisional application No. 61/825,831, filed on May 21, 2013.

(51) Int. Cl.
*H04B 10/61* (2013.01)
*H04B 10/67* (2013.01)
*H04B 10/69* (2013.01)
*H04L 7/00* (2006.01)
*H04L 7/027* (2006.01)

(52) U.S. Cl.
CPC ............ *H04B 10/616* (2013.01); *H04L 7/0276* (2013.01); *H04L 7/0075* (2013.01)

(58) Field of Classification Search
CPC .... H04B 10/67; H04B 10/671; H04B 10/616; H04B 10/69; H04B 10/691; H04L 7/0276; H04L 7/0075

USPC ................... 398/155, 202, 208, 209
See application file for complete search history.

(56) References Cited

U.S. PATENT DOCUMENTS

| | | | |
|---|---|---|---|
| 4,743,856 A | 5/1988 | Keating | |
| 5,963,351 A | 10/1999 | Kaplounenko et al. | |
| 6,219,166 B1 | 4/2001 | Shang et al. | |
| 6,342,694 B1* | 1/2002 | Satoh | H04B 10/6911 250/214 A |
| 6,350,981 B1* | 2/2002 | Uno | G01C 3/085 250/208.1 |
| 7,105,797 B2* | 9/2006 | Kimura | H03F 3/087 250/214 A |
| 7,991,302 B2* | 8/2011 | Xu | H03F 1/083 372/38.02 |

(Continued)

OTHER PUBLICATIONS

Nazari et al., "Ultra low-power receiver design for dense optical interconnects", May 2012, pp. 115-116, IEEE Optical Interconnects Conference 2012.
Debaes et al. "Receiver-less optical clock injection for clock distribution networks", Mar. 2003, pp. 400-409, IEEE journal of selected topics in quantum electronics v9n2.

(Continued)

*Primary Examiner* — Dalzid Singh
(74) *Attorney, Agent, or Firm* — Lumen Patent Firm

(57) ABSTRACT

A completely digital optical receiver is provided. The optical receiver includes a photodiode configured to provide a photodiode output responsive to an on-off keyed (OOK) optical input. Two or more digital inverters connected in series with each other are configured to receive the photodiode output and provide an amplified digital output. A digital clock and data recovery (CDR) circuit receives the amplified digital output and provides a clock output and a data output. A digital photodiode discharging circuit is connected to the photodiode and controlled by the clock output of the CDR circuit.

9 Claims, 3 Drawing Sheets

(56) References Cited

U.S. PATENT DOCUMENTS

| | | |
|---|---|---|
| 8,483,569 B2 | 7/2013 | Davidson et al. |
| 2009/0142069 A1* | 6/2009 | Wree ............... H04B 10/25133 398/147 |
| 2011/0097083 A1 | 4/2011 | Barrett |
| 2013/0294782 A1 | 11/2013 | Liboiron-Ladouceur et al. |

OTHER PUBLICATIONS

Miller, "Optical interconnects to electronic chips", Sep. 2010, pp. F59-F70, Applied Optics v49n25.

* cited by examiner

FULLY DIGITAL CMOS BASED OPTICAL RECEIVER

CROSS REFERENCE TO RELATED APPLICATIONS

This application is a continuation in part of U.S. Ser. No. 14/283,687, filed on May 21, 2014, and hereby incorporated by reference in its entirety.

Application Ser. 14/283,687 claims the benefit of U.S. provisional patent application 61/825,831, filed on May 21, 2013, and hereby incorporated by reference in its entirety.

FIELD OF THE INVENTION

The present invention relates to optical receivers. More specifically, it relates to completely digital optical receivers.

BACKGROUND

Conventional receivers in optical communication systems are usually designed to maximize receiver sensitivity. This approach originates from telecommunication applications, where very weak optical signals have to be recovered from noise. The detected signals are amplified and processed in the electronic domain. The ability to detect very weak signals is a much more important design consideration for telecommunications applications compared to the power dissipation of the receiver. This is especially relevant in long-haul communications systems, where improved receiver sensitivity implies that a longer transmission distance can be achieved.

In optical interconnects for data center networks, the transmission distance of data is of less concern, and end-to-end power consumption of the link is the primary design parameter of the system. This implies different requirements for the receiver. Data-centers usually contain a large number of servers (e.g., up to several hundred thousand) clustered in groups. These servers and clusters are connected to each other via a communication network. The data capacity of this interconnection network depends on the performance of the data center. As a rule of thumb, 0.1 Byte/sec of communication capacity is required per Flop per second performance. As the overall performance of data-centers is the order of Petaflops/per second, the overall data-capacity of a single data-center interconnect network is on the order of petabits/sec. More importantly, it is well known that the performance of data-centers increases by roughly a factor 1000 per 10 years, and as a result of this scaling, the performance of the data-center communication network will need to increase proportionally. Because of the large data capacity requirement of the data center communication network, optical communication is rapidly evolving as the dominant technology for intra-data-center communications.

However, investigations have shown that if conventional optical receivers (e.g., telecommunications receivers with trans-impedance amplifier (TIA) front ends) are used in such data center networks, the power consumption can be prohibitive. For example, one 10-year projection estimated 100 MW dissipation by the optical network of a data center.

Accordingly, it would be an advance in the art to provide optical receivers suitable for such data center network applications.

SUMMARY

According to an embodiment of the present invention, a novel receiver structure is provided for direct detection of on-off keyed systems. This is in contrast to currently implemented on-off keyed receivers that contain trans-impedance amplifiers and limiting amplifiers. Such amplifiers act as analog front ends that continuously dissipate power. Instead the present invention replaces the conventional analog front ends with a fully digital circuit that only dissipates power at one-zero and zero-one transitions. This leads to optical receivers for data center applications that dissipate less power compared to their telecommunication counterparts.

One application of optical receivers as described herein is the data center network application described above. Another application is on-chip interconnects. Computers and Central Processing Units (CPUs) scale according to Moore's law. Amdahl's balanced system law states that under ideal operation conditions for each flop/s of CPU performance one byte/sec IO bandwidth is required of which roughly 50% has to be communicated off the chip. At present, data flows in and out of the CPU via (repeatered) electronic links. It has been recognized that about 200 times more energy is needed to transport a bit from a nearest neighboring chip (2-10 pJ/bit) than to operate on it (0.1-0.05 pJ/bit), and that this number can increase with a factor 1000 for a large system containing multiple transceiver hops. The present approach leads to photonic communication links that offer an improved bandwidth distance product compared to electronic links, thereby lowering power consumption and increasing bandwidth density.

DETAILED DESCRIPTION

Figure 1:
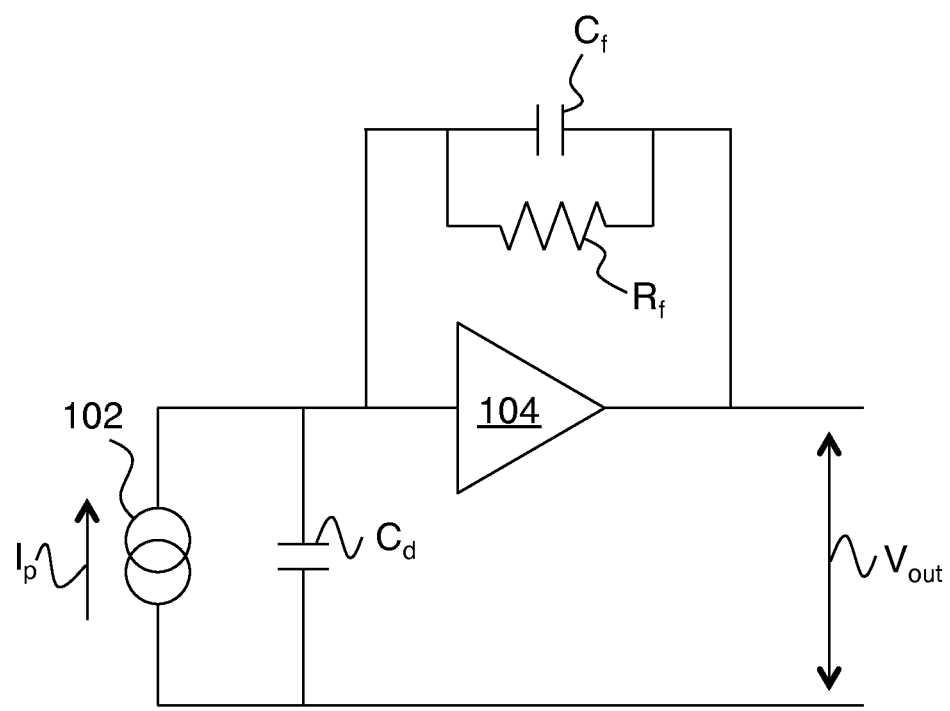
FIG. 1 shows a conventional prior art optical receiver.

FIG. 1 shows a conventional prior art optical receiver. The equivalent circuit of a photodiode is a current source (102) with a capacitor ($C_d$) in parallel. When an optical pulse hits the photodiode, an electrical current ($I_p$) is generated. This current charges the capacitor $C_d$ leading to a voltage difference. This voltage is inversely proportional to the photodiode capacitance; thus the smaller the capacitance, the larger the voltage difference is. In principle, the output voltage of the photodiode could be used to drive CMOS electronic circuits. However, for current generation photodiodes, the capacitances are too large to create voltages suitable for directly driving CMOS (i.e., voltages larger than typical CMOS thresholds). In order to create sufficient voltages, a trans-impedance amplifier (TIA) 104 is placed at the output of the photodiode. Typically, the TIA is based on an operational amplifier. The function of the trans-impedance amplifier is two-fold. First, the TIA generates an output voltage ($V_{out}$) suitable for driving CMOS. Secondly, use of a TIA ensures fast operation since it introduces a mechanism to rapidly discharge the photo-diode capacitor when a zero-bit arrives.

It is helpful to consider the various contributions to the equivalent input current noise density of a trans-impedance amplifier. At low frequencies, thermal noise generated by the feedback resistance $R_f$ dominates. At higher frequencies, FET channel noise is the most dominant noise source of the receiver (this is essentially thermal noise generated in the FET channel). A Smith-Personic analysis reveals that the FET channel noise scales with the bandwidth to the power three. At high frequencies also the 1/f noise should also be considered as it scales with the bandwidth to the power two. An important figure of merit is $C_T^2/g_m$ where $g_m$ is the transconductance of the FET involved, and $C_T=C_d+C_{FET}+(1+A)C_f$. Here $C_d$ is the capacitance of the photodiode, $C_{FET}$ is the total FET capacitance and $C_f$ is the feedback capacitance, limited by the bandwidth of the receiver. The Miller effect teaches that the feedback capacitance has to be multiplied by the open loop gain (A) of the amplifier. Since the open loop gain of the amplifier is generally large, the receiver noise at high frequencies is mainly from the feedback capacitance. Hence, to arrive at sufficient receiver performance (e.g., in terms of Bit-Error-Rate), the signal to noise ratio has to be sufficient, translating directly into a minimum photo-current and thus received optical power. This mechanism ultimately limits the receiver sensitivity and the power dissipation of the TIA. The TIA is an analog front end that continuously dissipates power.

Figure 2:
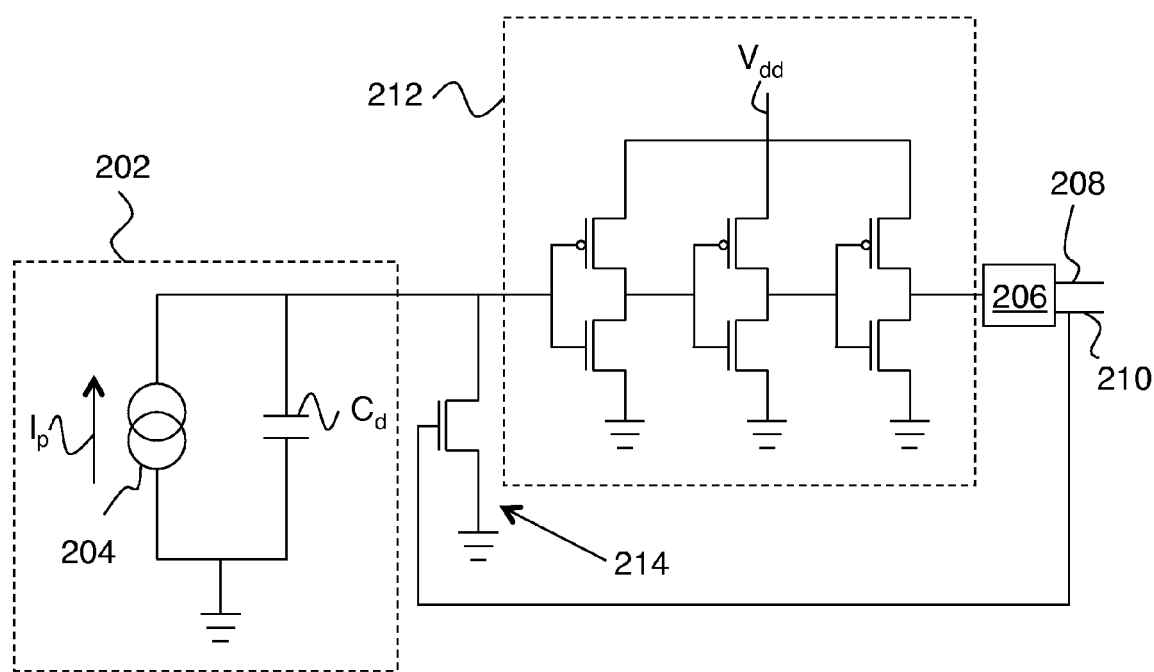
FIG. 2 shows an optical receiver according to an embodiment of the invention.

FIG. 2 shows an optical receiver according to an embodiment of the invention. Here, photodiode 202 is modeled as a current source 204 (providing photocurrent $I_p$) in parallel with capacitor $C_d$. The voltage from photodiode 202 drives a chain of inverters 212. As an incoming one-bit charges the capacitor, the voltage over the capacitor is amplified in stages to a level higher than the CMOS threshold voltages. At the inverter output stage is a clock and data recovery circuit 206 that provide a data signal 208 and a clock signal 210. Clock signal 210 is used to discharge photodiode 202 via a digital photodiode discharging circuit 214. This provides a circuit that allows for high speed operation. The digital receiver circuit shown in FIG. 2 has two main advantages compared to traditional analog TIA based receivers. First, a fully digital receiver only dissipates power at zero-one and one-zero transitions. This leads to a large improvement with respect to power dissipation. Secondly, a fully digital receiver has no feedback capacitor and resistor. This largely eliminates the Miller effect and leads to improved signal to noise ratio. This enhances the receiver sensitivity.

An exemplary embodiment of the invention is an optical receiver that includes: 1) a photodiode (e.g., 202 on FIG. 2) configured to provide a photodiode output responsive to an on-off keyed (OOK) optical input; 2) two or more digital inverters connected in series with each other (e.g., 212 on FIG. 2), and configured to receive the photodiode output and provide an amplified digital output; 3) a digital clock and data recovery (CDR) circuit (e.g., 206 on FIG. 2) that receives the amplified digital output and provides a clock output and a data output; and 4) a digital photodiode discharging circuit (e.g., 214 on FIG. 2) connected to the photodiode and controlled by the clock output of the CDR circuit.

Preferably, the photodiode is connected directly to the digital inverters without any intervening analog amplifier, as in the example of FIG. 2. Preferably, no analog feedback is present, thereby eliminating electrical noise from a feedback resistor and/or a feedback capacitor.

The capacitance of the photodiode is preferably less than 30 fF. The digital inverters preferably have transistors with a gate capacitance of 10 fF or less. The CDR circuit preferably has transistors with a gate capacitance of 10 fF or less. The digital photodiode discharging circuit preferably has transistors with a gate capacitance of 10 fF or less.

To date, no demonstration of a fully digital receiver has been given. There are three important reasons for this. The first reason is that fully digital receivers require photodiodes with capacity below a few tens of femto-Farads. Until recently it was not possible to fabricate such photodiodes. Recent advances in photodetector technology are referenced below. The second reason is that a fully digital receiver requires CMOS transistors with a gate capacitance on the order of 1 femto-Farad. However, CMOS technology development has progressed such that gate capacitances for 65 nm CMOS are on the order of a few femto-Farads, as required for fully digital receivers. The third reason is that broadband operation requires a practical solution for discharging the photodiode. Discharging via the internal resistance of the photo-diode would prevent broadband operation. This work provides a solution for rapidly discharging the photodiode, as described above.

Recently, two important results have been published on low capacitance photodiodes. The first result is low capacitance germanium avalanche photodiodes as described by Assefa et al. in "Reinventing germanium avalanche photodetector for nanophotonic on-chip optical interconnects" (Nature 464, 80-84, 2010, hereby incorporated by reference in its entirety). The built-in CMOS compatible avalanche effect also positively impacts the photodiode responsivity.

The second result is indium phosphide-on-insulator microdisk photodiodes as described by Hofrichter et al. in "Compact InP-on-SOI microdisks used as high-speed modulators and photodetectors" (European Conference on Optical Communications, P2.03, 2012, hereby incorporated by reference in its entirety). These devices have capacitances on the order of 40 femto-Farads and have demonstrated a static responsivity of 5 A/W. By reducing the disk size further, devices with capacitance on the order of a few femto-Farads can be realized.

Numerical simulations reveal that both devices would enable a fully digital receiver. The fully digital detection embodiment of the current invention has been numerically simulated for 65 nm CMOS technology. The digital front end includes a chain of inverters as on FIG. 2. To ensure broadband operation, discharging took place by using a discharge circuit driven by an external clock, also as shown on FIG. 2. Simulations were carried out using CMOS inverters with gate capacitances in the order of 1 femto-Farad. The photo-diode capacitance and resistances were matched with experimental values.

Figure 3:
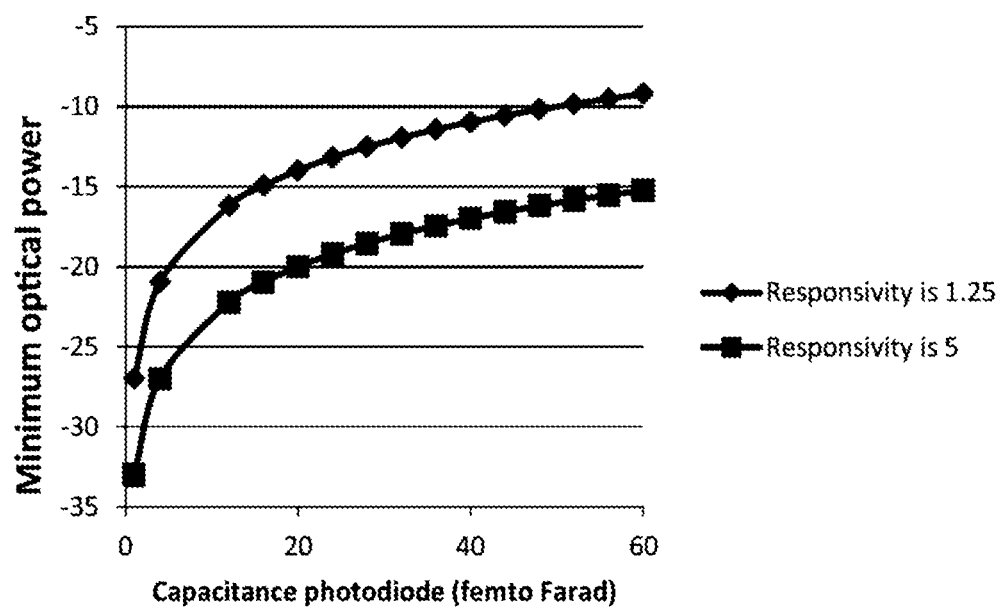
FIG. 3 shows simulated receiver sensitivity vs. photodiode capacitance for a digital receiver according to an embodiment of the invention.

These simulations indicate that fully digital receivers are feasible. The average power consumption of the scheme, exclusive of clock recovery for discharging was 30 microwatts, a few orders of magnitude below receivers using TIAs. The receiver sensitivity was −6 dBm for input capacitance ~50 fF (including photodiode and bondpad capacitance, no ESD (electrostatic discharge) protection assumed) for responsivities of 1 A/W and this number improves to −13 dBm if responsivity of 5 A/W is assumed. If the photo-diode capacitance can be reduced further to below 10 femto-Farads, significant improvement on current receiver sensitivity exists, as shown on FIG. 3. This figure shows these simulation results vs. assumed photodetector capacitance.

The invention claimed is:
1. An optical receiver comprising:
a photodiode configured to provide a photodiode output responsive to an on-off keyed (OOK) optical input;
two or more digital inverters connected in series with each other, and configured to receive the photodiode output and provide an amplified digital output;
a digital clock and data recovery (CDR) circuit that receives the amplified digital output and provides a clock output and a data output;
a digital photodiode discharging circuit connected to the photodiode and controlled by the clock output of the CDR circuit.

2. The optical receiver of claim 1, wherein the photodiode is connected directly to the digital inverters without any intervening analog amplifier.

3. The optical receiver of claim 1, wherein no analog feedback is present, whereby electrical noise from a feedback resistor and/or electrical noise from a feedback capacitor is eliminated.

4. The optical receiver of claim 1, wherein a capacitance of the photodiode is less than 30 fF.

5. The optical receiver of claim 1, wherein the digital inverters comprise transistors having a gate capacitance of 10 fF or less.

6. The optical receiver of claim 1, wherein the CDR circuit comprises transistors having a gate capacitance of 10 fF or less.

7. The optical receiver of claim 1, wherein the digital photodiode discharging circuit comprises transistors having a gate capacitance of 10 fF or less.

8. The optical receiver of claim 1, wherein the photodiode comprises a Germanium avalanche photodiode.

9. The optical receiver of claim 1, wherein the photodiode comprises an indium phosphide-on-insulator microdisk photodiode.

\* \* \* \* \*